(12) United States Patent
Krause

(10) Patent No.: US 10,426,229 B2
(45) Date of Patent: Oct. 1, 2019

(54) FOOTWEAR MANUFACTURING PROCESS

(71) Applicant: Lana S. Krause, Leawood, KS (US)

(72) Inventor: Lana S. Krause, Leawood, KS (US)

( * ) Notice: Subject to any disclaimer, the term of this patent is extended or adjusted under 35 U.S.C. 154(b) by 53 days.

(21) Appl. No.: 15/889,873

(22) Filed: Feb. 6, 2018

(65) Prior Publication Data

US 2018/0220746 A1 Aug. 9, 2018

Related U.S. Application Data

(60) Provisional application No. 62/455,268, filed on Feb. 6, 2017.

(51) Int. Cl.

| A43B 1/12 | (2006.01) |
|---|---|
| A43D 8/04 | (2006.01) |
| A43B 13/04 | (2006.01) |
| A43D 27/02 | (2006.01) |
| B07B 1/46 | (2006.01) |
| B30B 15/00 | (2006.01) |
| B02C 23/10 | (2006.01) |
| A43D 29/00 | (2006.01) |
| B29B 17/00 | (2006.01) |
| B29B 17/02 | (2006.01) |
| B29B 17/04 | (2006.01) |
| A43B 1/00 | (2006.01) |

(Continued)

(52) U.S. Cl.
CPC .............. *A43D 8/04* (2013.01); *A43B 1/0063* (2013.01); *A43B 1/12* (2013.01); *A43B 13/04* (2013.01); *A43D 27/02* (2013.01); *A43D 29/00* (2013.01); *B02C 23/10* (2013.01); *B07B 1/4609* (2013.01); *B07B 1/4672* (2013.01); *B29B 17/0026* (2013.01); *B29B 17/02* (2013.01); *B29B 17/0412* (2013.01); *B30B 15/0088* (2013.01); *A63B 39/06* (2013.01); *B29B 2017/0224* (2013.01); *B29B 2017/042* (2013.01); *B29B 2017/0484* (2013.01); *B29L 2031/548* (2013.01)

(58) Field of Classification Search
CPC .. A43B 1/10; A43B 1/12; A43D 29/00; A43D 27/02; A43D 2200/00; A43D 999/00; B07B 1/4609; B07B 1/4672; B02C 23/10; B29B 17/0026; B29B 17/02; B29B 2017/042; B29B 17/0412
USPC ......................................... 12/146 B, 146 BR
See application file for complete search history.

(56) References Cited

U.S. PATENT DOCUMENTS 5,369,830 A * 12/1994 Chiarabini Bravi ..... A43B 1/12
 12/146 BR
2010/0293814 A1* 11/2010 Skaja ....................... A43B 1/12
 36/25 R

(Continued)

*Primary Examiner* — Marie D Bays
(74) *Attorney, Agent, or Firm* — Law Office of Mark Brown, LLC; Christopher M. DeBacker (57) ABSTRACT

A method of reclaiming used tennis balls and transforming the material reclaimed from the tennis balls into soles for footwear. This multi-step process requires acquiring used tennis balls, grinding the tennis balls into ground rubber bits (usable elements) and tennis ball "fuzz" (unusable elements). The rubber and fuzz are passed through a screen which allows the rubber bits to exit the screen but retains the fuzz. The rubber is then mixed with an $H_2O$ and Polyurethane mixture to form a rubber mixture. This mixture is then pressed to a desired thickness in a hydraulic press, cured, and then cut out into a desired shoe sole shape and size which can be used to manufacture footwear.

9 Claims, 11 Drawing Sheets

(51) Int. Cl.
    *A63B 39/06*    (2006.01)
    *B29L 31/54*    (2006.01)

(56) References Cited

U.S. PATENT DOCUMENTS

2013/0212906 A1* 8/2013 Goldwasser ............. A43B 1/12
                                                       36/83
2018/0220746 A1* 8/2018 Krause .................. B07B 1/4672

* cited by examiner

FOOTWEAR MANUFACTURING PROCESS

CROSS-REFERENCE TO RELATED APPLICATION

This application claims priority in U.S. Provisional Patent Application No. 62/455,268 Filed Feb. 6, 2017, which is incorporated herein by reference.

BACKGROUND OF THE INVENTION

1. Field of the Invention

The present invention relates generally to a footwear manufacturing process and method thereof, and more specifically to a method of reclaiming and using tennis balls for manufacturing the sole of a shoe or other piece of footwear.

2. Description of the Related Art

Shoes often have soles made of rubber or other flexible yet resilient material. This typically requires soles to be formed out of new sources of rubber or other manufacturing materials devoted purely for that purpose.

As tennis balls are used, they quickly lose their "bounce," and wear out. However, presently there is no good use for used or reclaimed tennis balls, and they mostly wind up in the garbage, taking up space in landfills.

Heretofore there has not been available a system or method for footwear manufacturing with the advantages and features of the present invention

BRIEF SUMMARY OF THE INVENTION

The present invention generally provides a method of reclaiming used tennis balls and transforming the material reclaimed from the tennis balls into soles for footwear. This multi-step process requires acquiring used tennis balls, grinding the tennis balls into ground rubber bits (usable elements) and tennis ball "fuzz" (unusable elements). The rubber and fuzz are passed through a screen which allows the rubber bits to exit the screen but retains the fuzz. The rubber is then mixed with an H2O and Polyurethane mixture to form a rubber mixture. This mixture is then pressed to a desired thickness in a hydraulic press, cured, and then cut out into a desired shoe sole shape and size which can be used to manufacture footwear.

BRIEF DESCRIPTION OF THE DRAWINGS

The drawings constitute a part of this specification and include exemplary embodiments of the present invention illustrating various objects and features thereof.

DETAILED DESCRIPTION OF THE PREFERRED EMBODIMENTS

I. Introduction and Environment

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

II. Preferred Embodiment Footwear Manufacturing Process

Referring to the figures in detail, FIGS. 1-9 show a step-by-step process of how the present invention operates, whereby a footwear element 38 is generated out of used tennis balls 4.

Figure 1:
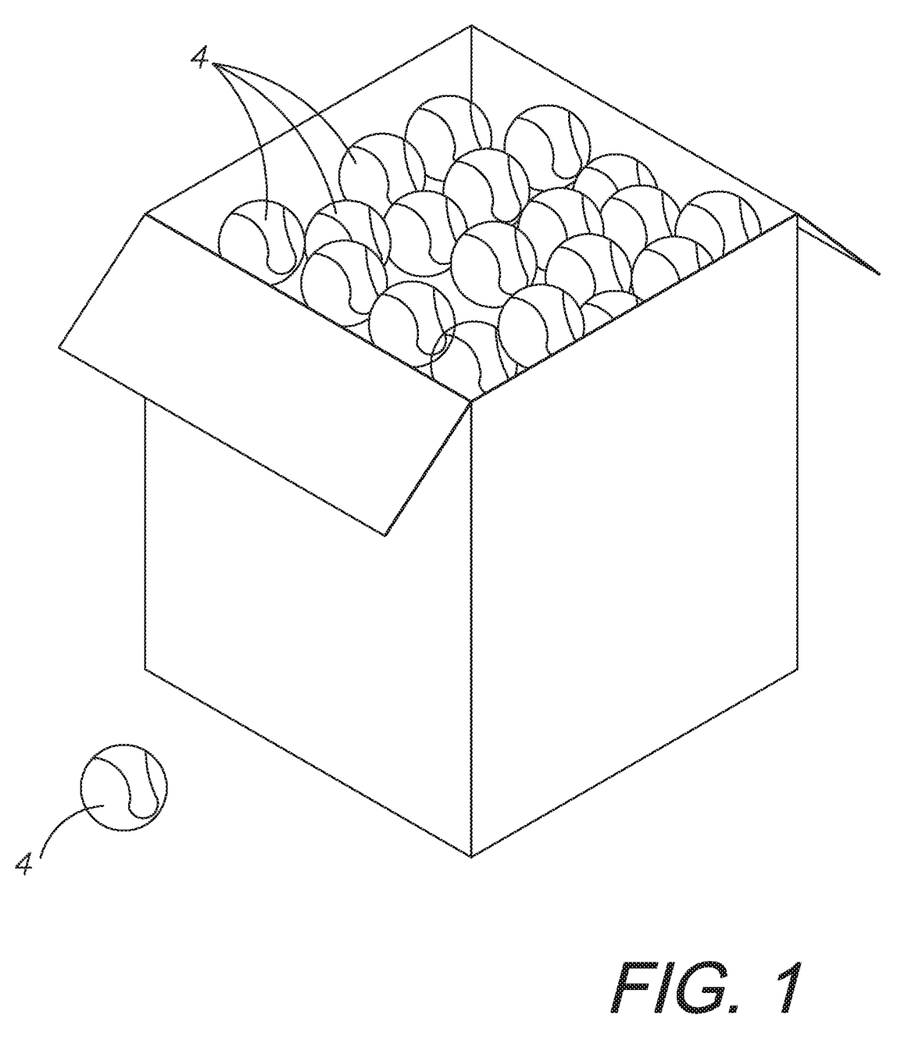
FIG. 1 is a three-dimensional isometric view of a plurality of tennis balls used as a construction component in association with a preferred embodiment of the present invention.

FIG. 1 shows the collection of used tennis balls 4, such as from tennis clubs, teams, and individuals. This process could include a donation station or other suitable means for getting the used tennis balls from their original owners who have no further use for them to the manufacturer.

Figure 2:
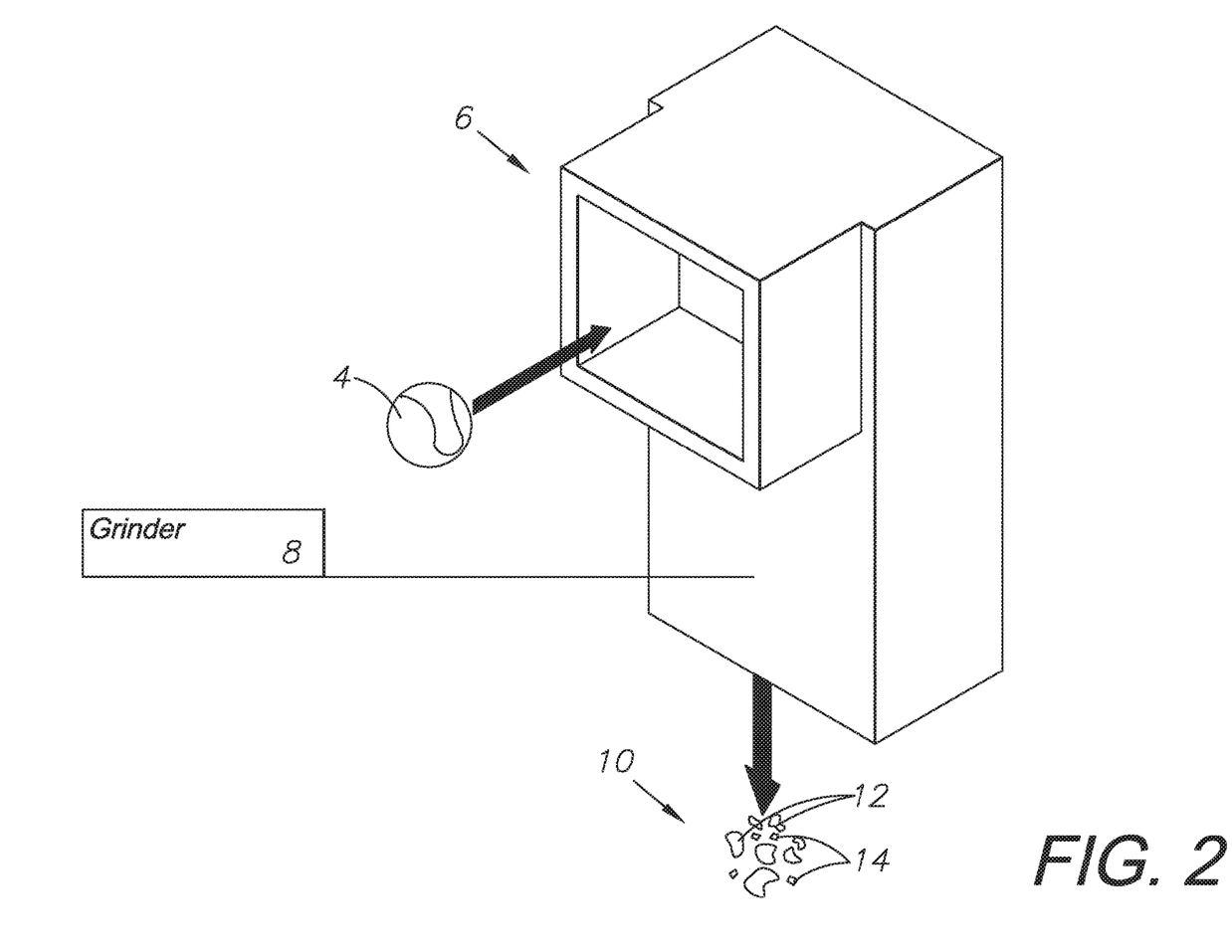
FIG. 2 is a three-dimensional isometric view showing tennis balls of FIG. 1 being ground into usable materials and unusable materials.

FIG. 2 shows the tennis balls 4 being placed into a plastic granulator 6 which includes a grinder 8 which grinds the balls into a ground mass 10 including tiny usable pieces 14 and unusable tennis "fuzz" 12.

Figure 3:
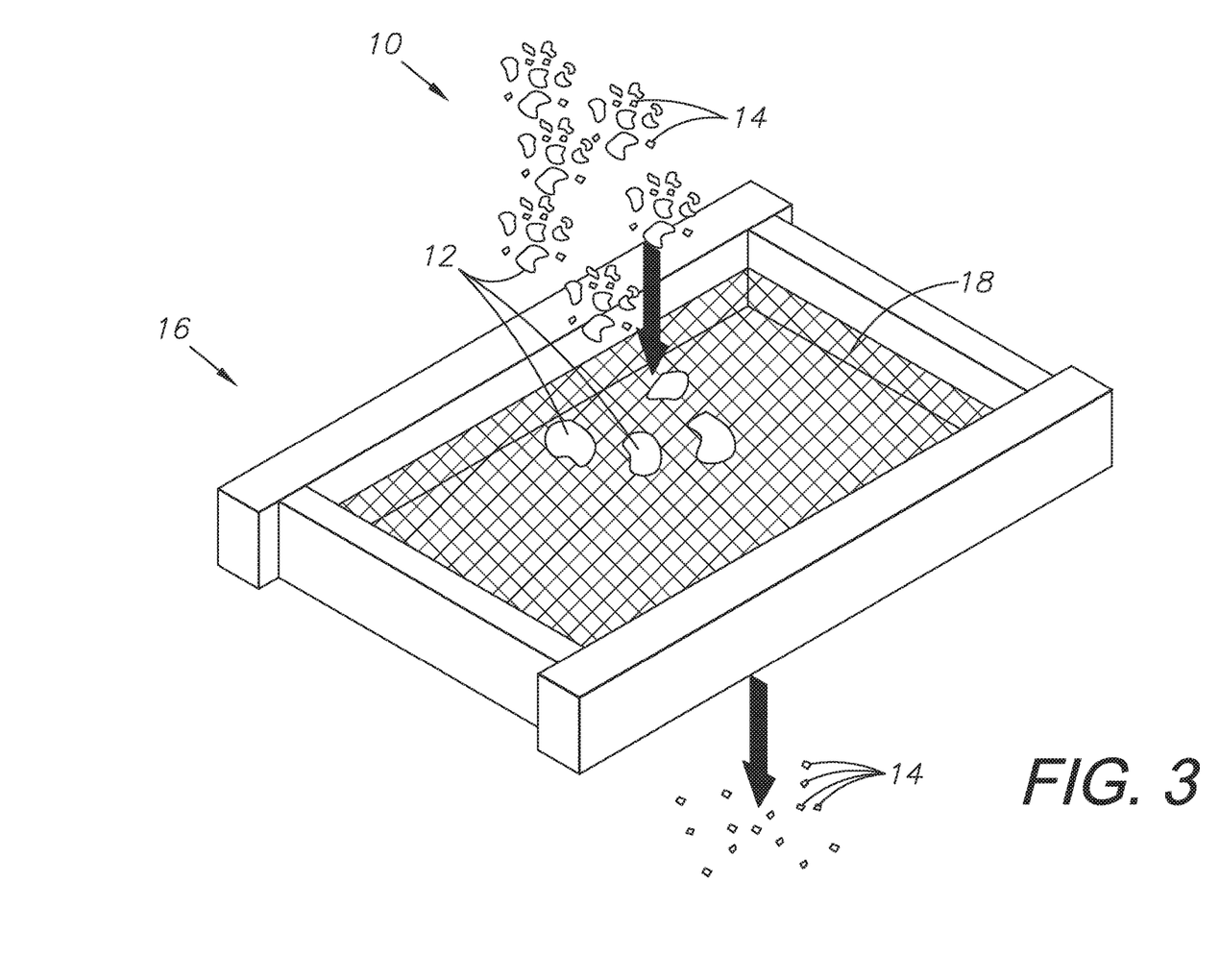
FIG. 3 is a three-dimensional isometric view showing the usable material of FIG. 2 being separated out from unusable material.
Figure 4:
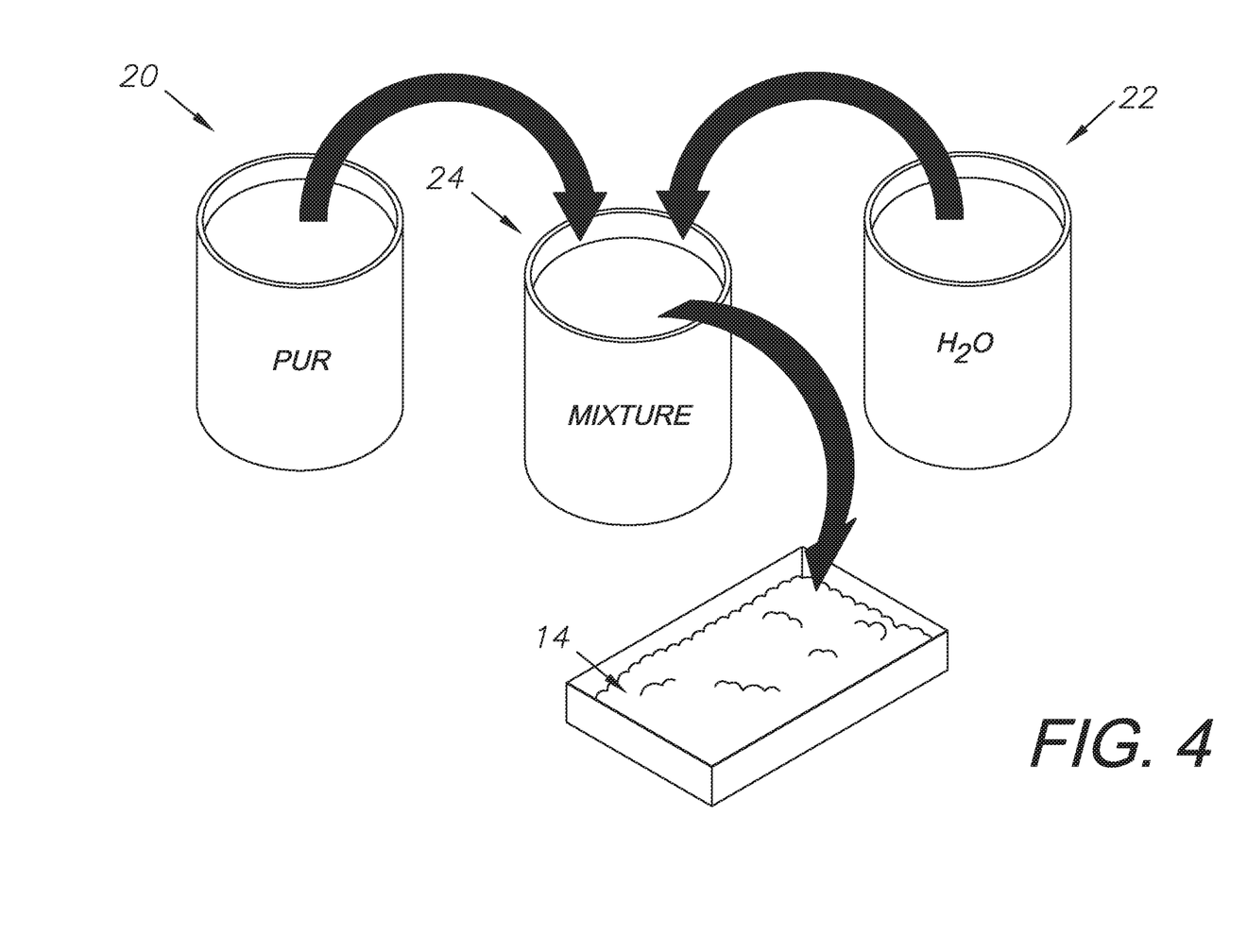
FIG. 4 is a three-dimensional isometric view showing combining of components to form a rubber, water, and polyurethane mixture.

FIG. 3 shows the results of the grinding process, whereby the ground mass 10 passes through a screen 16 with ⅛" holes 18. This step is used to separate the rubber elements 14 from the felt "fuzz" 12 which covers the rubber ball. A portion of the fuzz 12 may be added back into the mixture (approximately 0.5 oz.) as shown in FIG. 4. The screen could be constructed from ⅛-inch chicken wire attached to a wooden frame.

FIG. 4 shows the creation of a rubber mixture which includes the rubber crumb bits/granules 14 from FIG. 3, along with a combination of water 22 and polyurethane 20. A mixture of water 22 and polyurethane 20 is labeled as 24 in the figures. The ratio here is 5.2 oz. of polyurethane to 0.6 oz. of water, and adding that mixture to one pound (1 lb.) of rubber bits. The resultant mixture is labeled 28 and shown in FIGS. 5A and 5B.

Figure 5A:
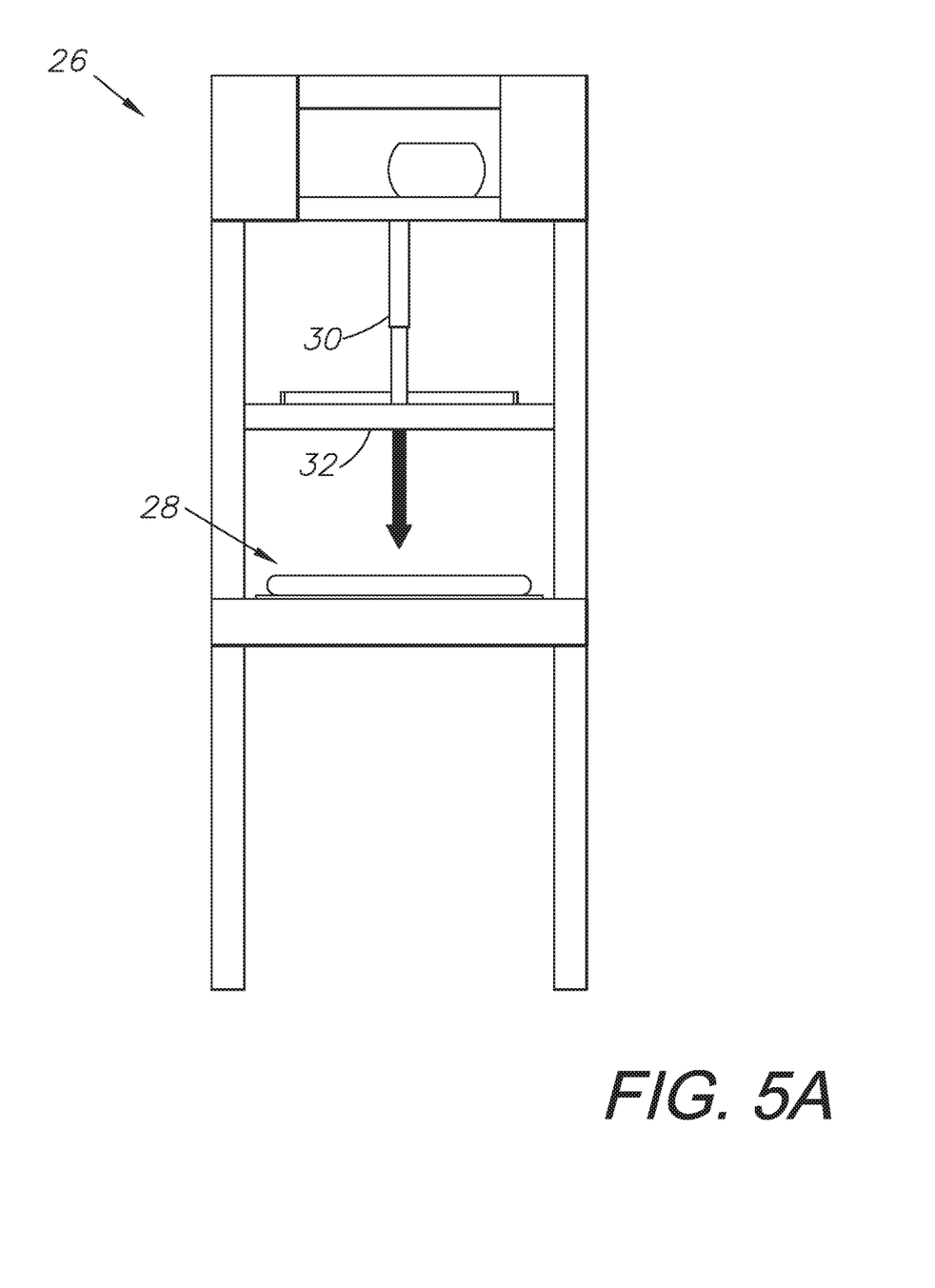
FIG. 5A is a front elevational view showing a first step of pressing the mixture of FIG. 4.
Figure 5B:
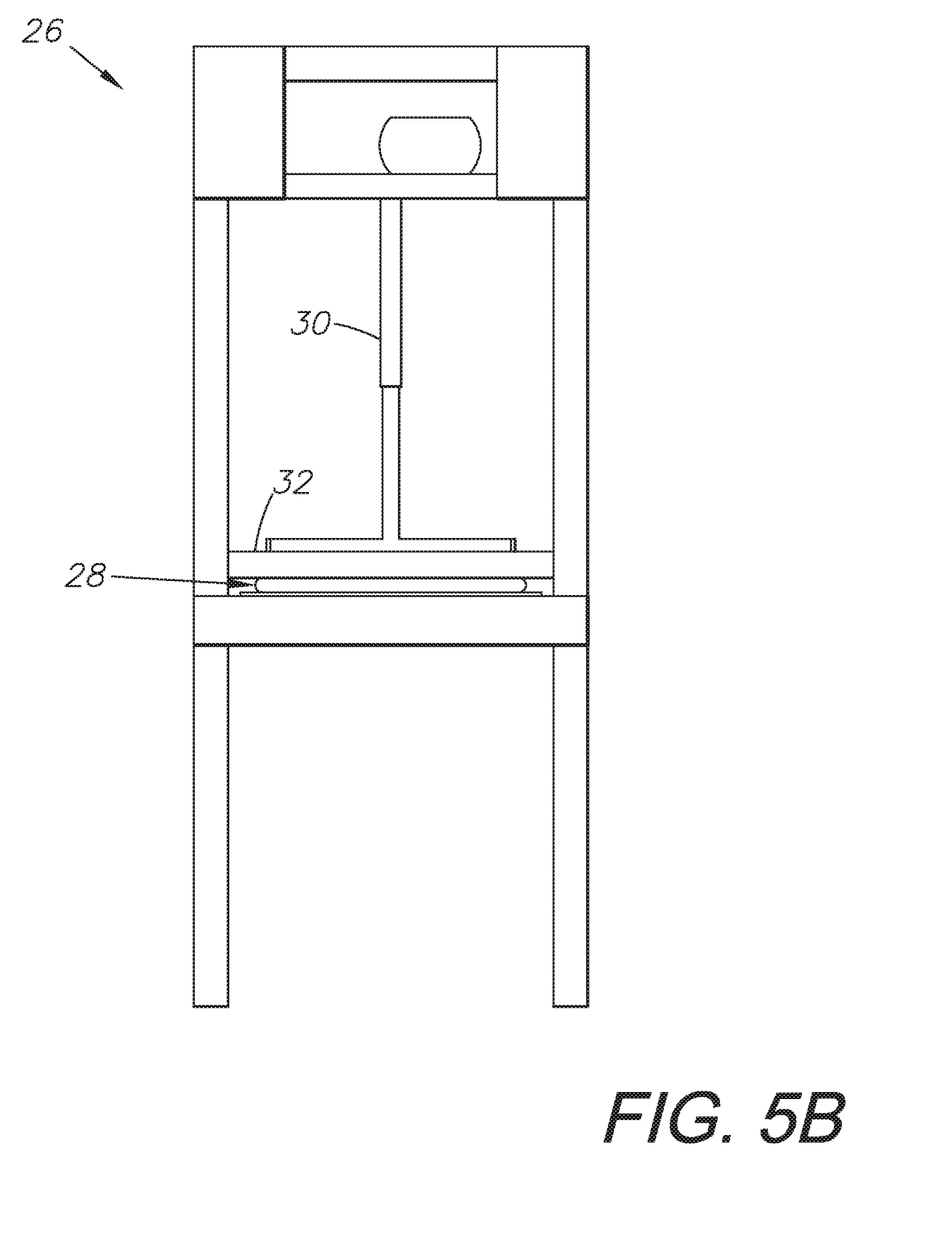
FIG. 5B is a front elevational view showing a second step of pressing the mixture of FIG. 4.

FIGS. 5A and 5B show this rubber mixture 28 being compressed using a hydraulic press 26 using a hydraulic arm 30 affixed to a plate 32. A lubricant is applied to the metal plates 32 of the press to prevent sticking. This step presses the rubber mixture into a flat useable sheet. The lubricant can be any suitable lubricant to prevent sticking, including standard cooking spray which may contain canola, palm, and coconut oil or other similar oils.

Figure 6:
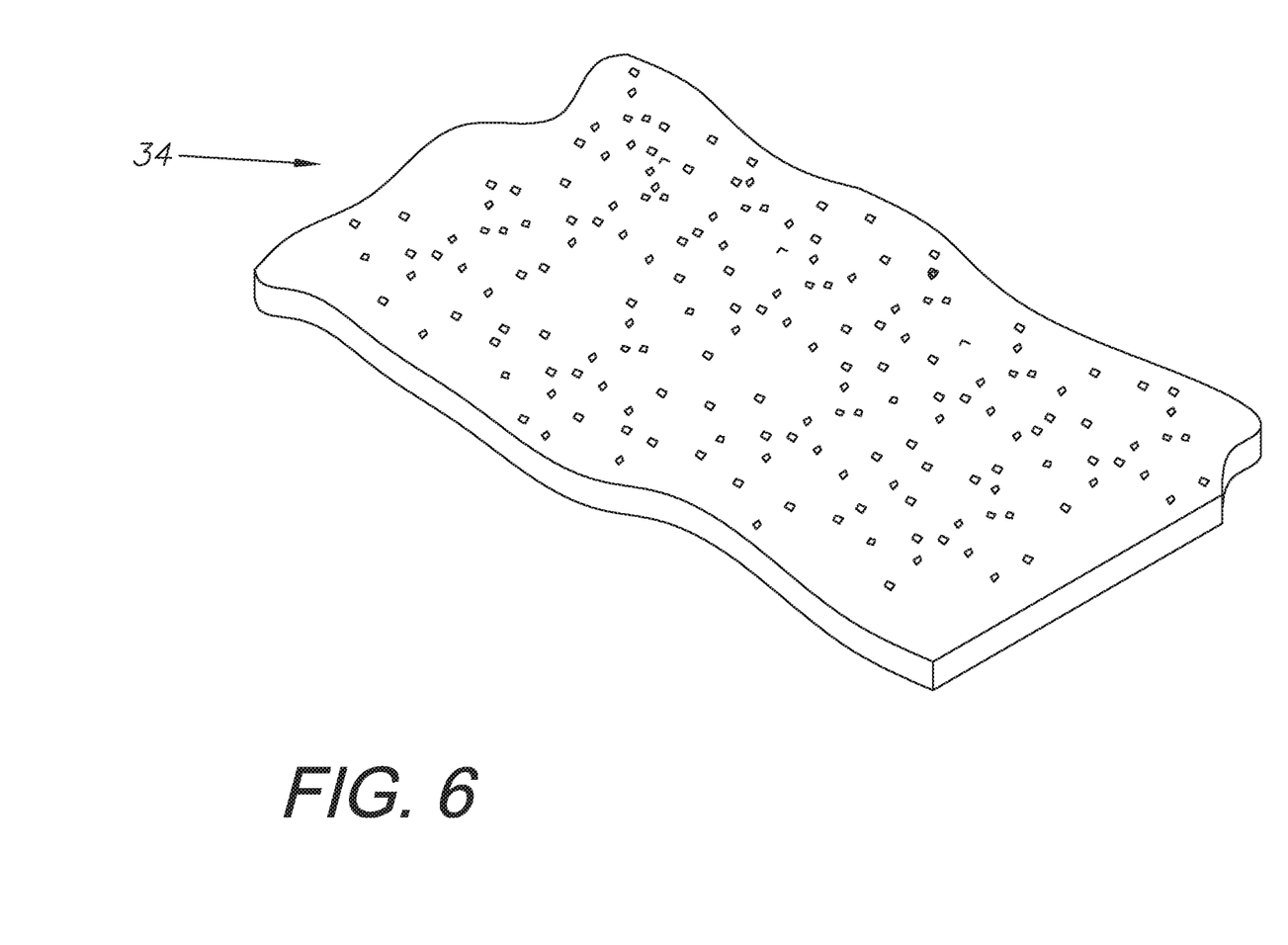
FIG. 6 shows a pressed mixture of FIG. 4 being cured.
Figure 7:
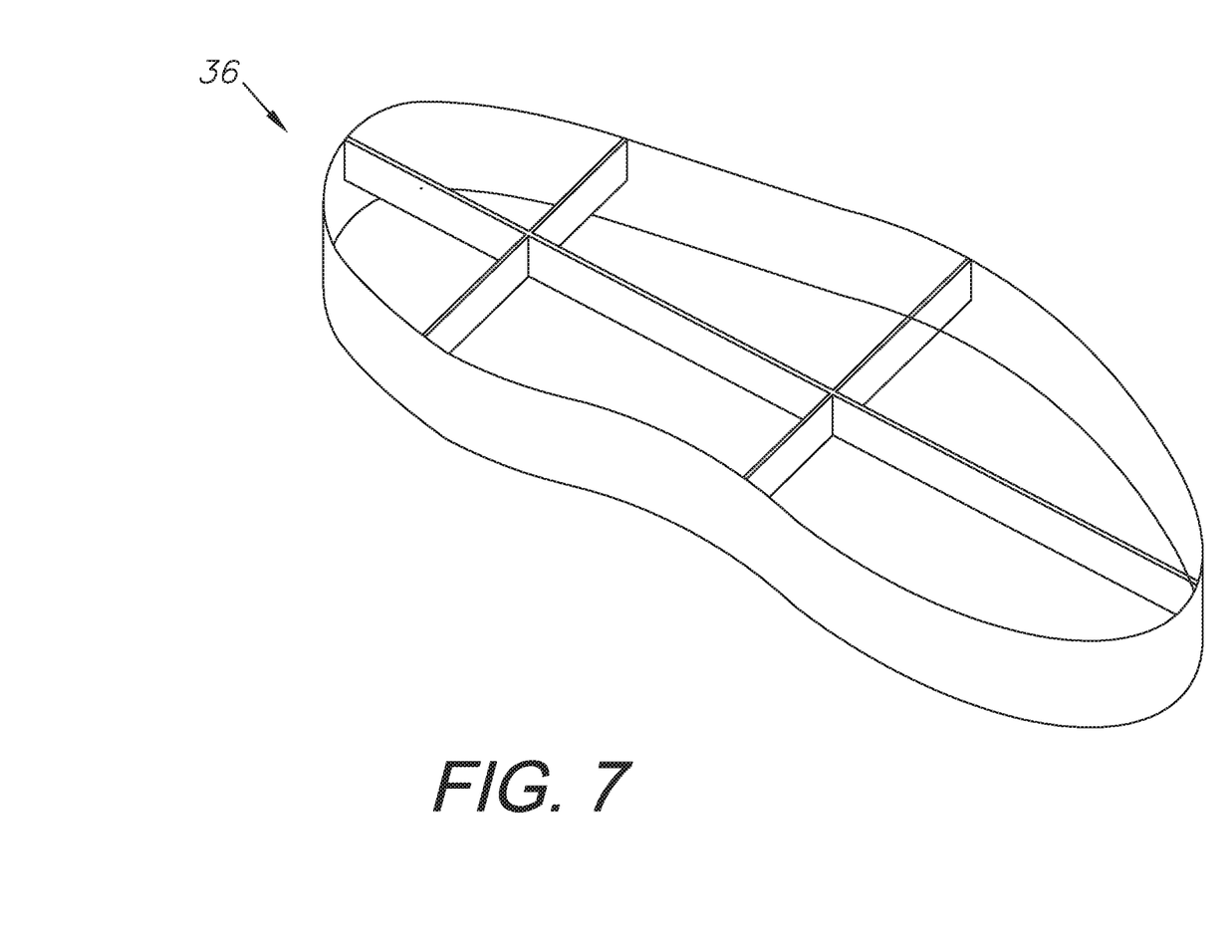
FIG. 7 is a three-dimensional isometric view of an example shoe form cutout tool.

FIG. 6 shows this rubber mixture pressed into a sheet 34 after three hours of curing. FIG. 7 shows a die 36 used to cut the shape of soles from the sheet of cured rubber mixture 34. These would correspond to the size of the footwear desired.

Figure 8:
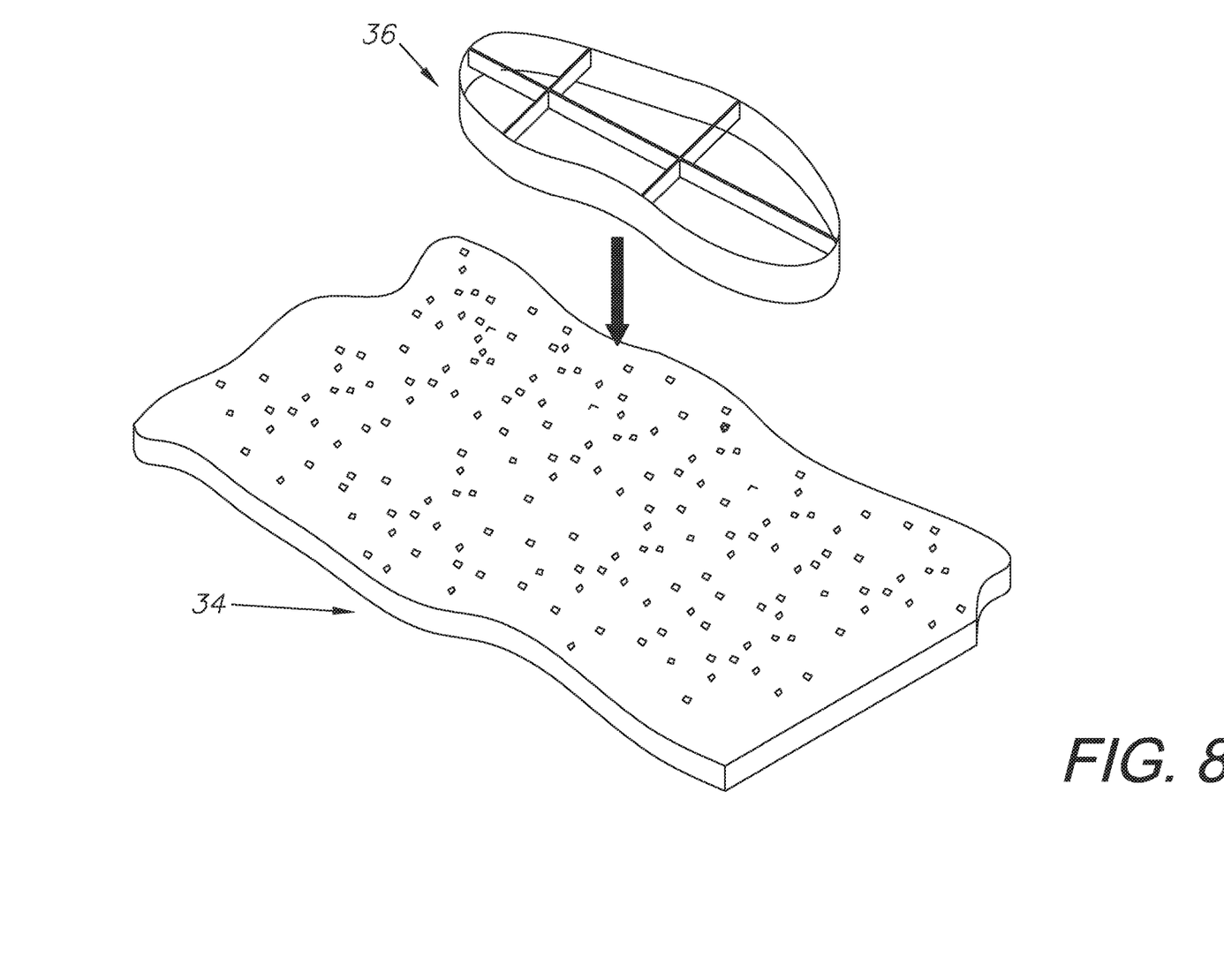
FIG. 8 is a three-dimensional isometric view showing the use of the tool of FIG. 7 on the cured mixture of FIG. 6.
Figure 9:
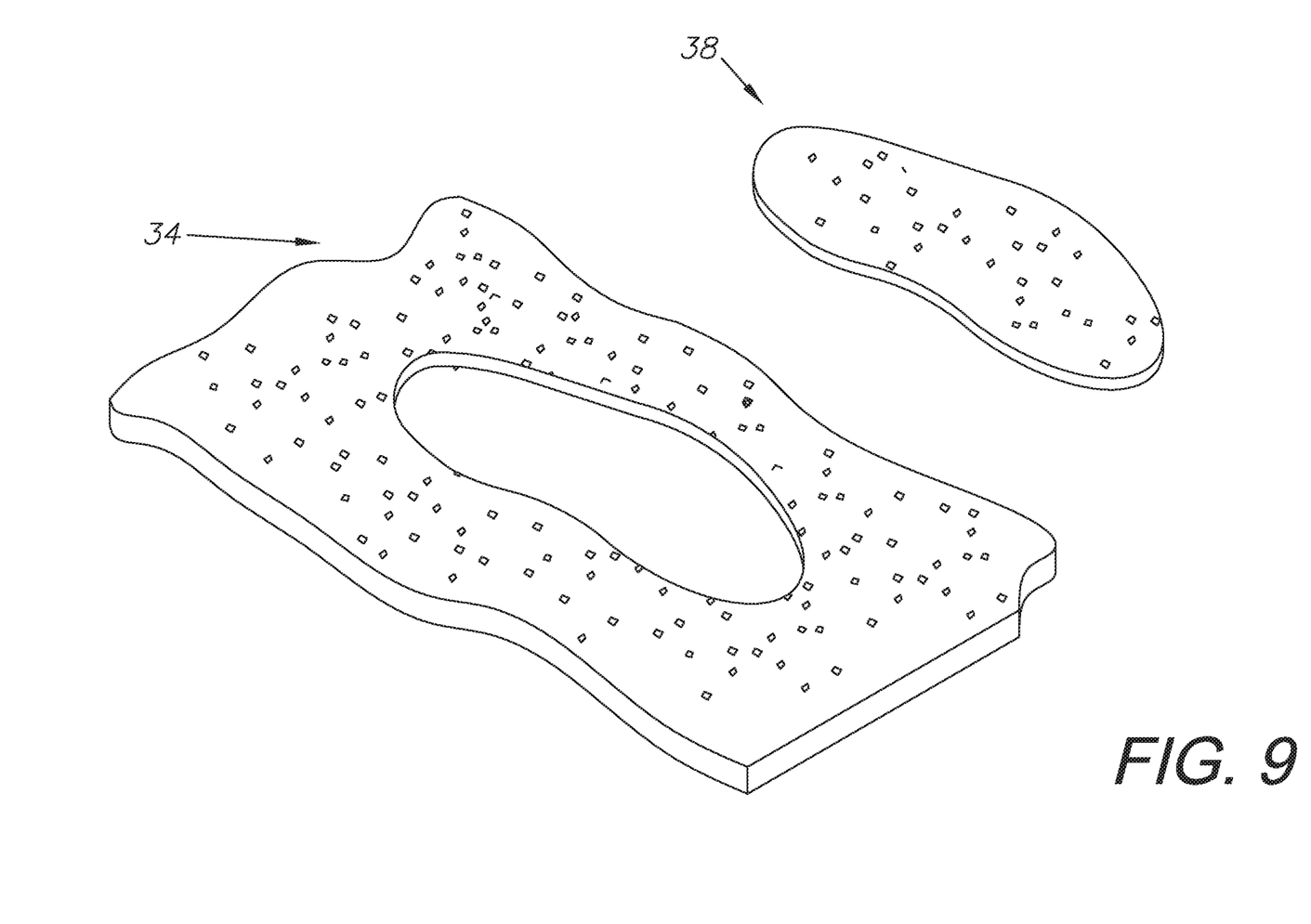
FIG. 9 shows the resulting footwear construction piece used for footwear soles resulting from the process shown in FIG. 8.

FIG. 8 shows the die 36 being used on the sheet 34, and FIG. 9 shows a shoe sole 38 cut from the rubber mixture, which can then be placed into a piece of footwear. The unused portion of the rubber mixture can be placed back into the granulator, as shown in FIG. 2, to be repurposed and reused for additional soles. Alternatively, there may be no need for this step in an ideal embodiment where plates are incorporated into the hydraulic press step which creates soles with minimal excess product.

Figure 10:
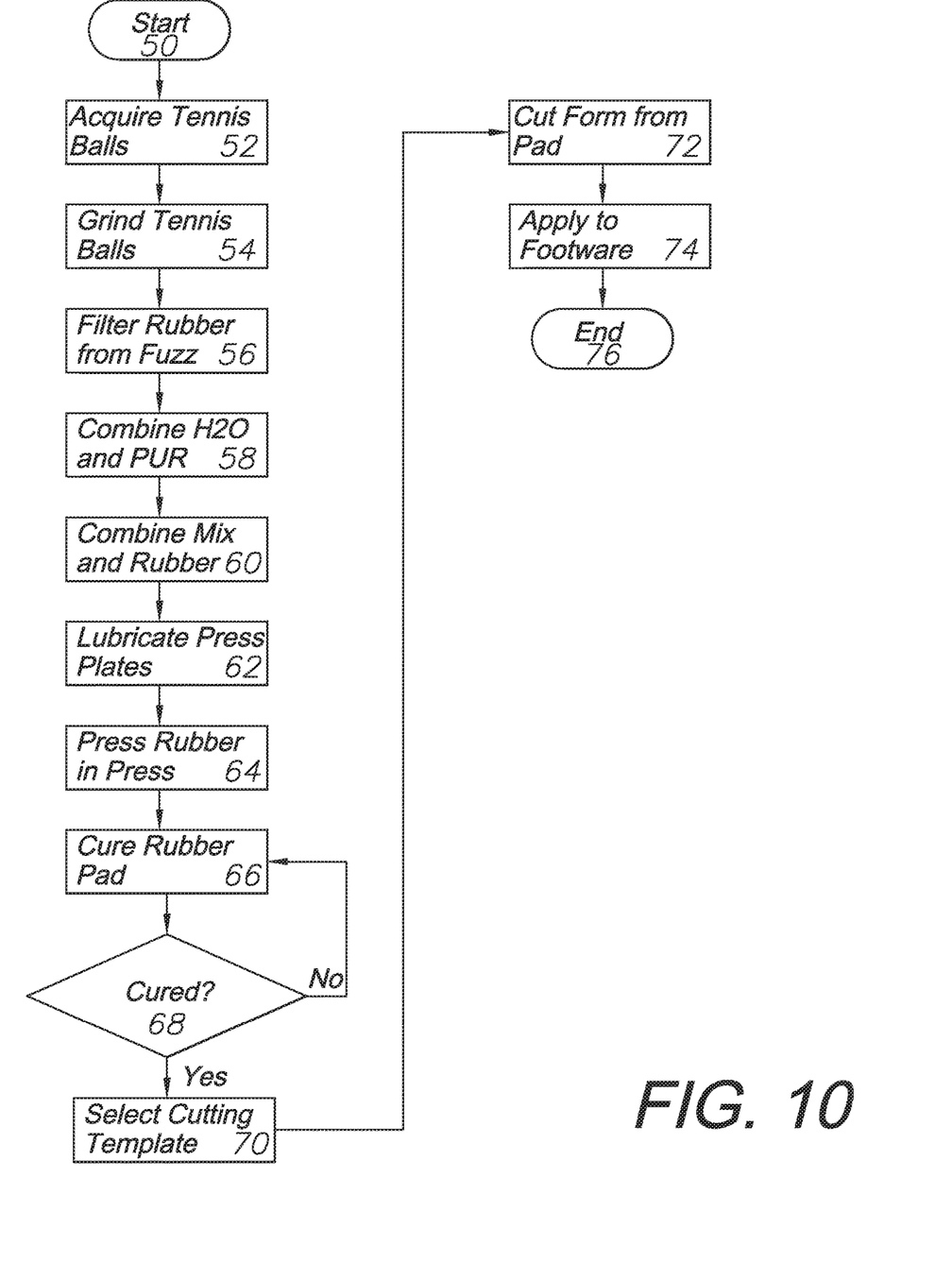
FIG. 10 shows a flowchart diagramming the steps required to practice the embodiment of the present invention shown in FIGS. 1-9.

FIG. 10 runs through these steps in a flowchart diagramming out the method of steps required. As above, the process starts at 50, and the used tennis balls are acquired at 52. These are ground in the plastic granulator at 54 and filtered into the usable rubber pieces at 56.

The H2O and Polyurethane are mixed at 58 and combined with the rubber pieces at 60. The hydraulic press is lubricated at 62, and the rubber, H2O, and polyurethane mixture is pressed into a sheet at 64. The resulting sheet is cured for three hours at 66. The user will check at 68 whether the sheet is fully cured—if not, curing continues. If curing is achieved at 68, the desired cutting template die is selected at 70 and applied to the sheet at 72, resulting in a shoe sole which is applied to footwear at 74. The process then ends at 76.

It is to be understood that while certain embodiments and/or aspects of the invention have been shown and described, the invention is not limited thereto and encompasses various other embodiments and aspects.

Having thus described the invention, what is claimed as new and desired to be secured by Letters Patent is:

1. A method of manufacturing a shoe sole, the method comprising the steps:
   acquiring a plurality of tennis balls
   grinding the tennis balls in a granulator, thereby generating felt fuzz and rubber granules;
   passing said felt fuzz and rubber granules through a screen, thereby separating said rubber granules from said felt fuzz;
   combining water and polyurethane, resulting in a water and polyurethane mixture;
   combining said water and polyurethane mixture with said rubber granules;
   mixing said rubber granules and said water and polyurethane mixture into a rubber mixture;
   placing said rubber mixture into a hydraulic press;
   pressing said rubber mixture into a sheet;
   curing said sheet;
   selecting a cut-out die, said cut-out die shaped for forming a footwear sole;
   cutting a sole from said sheet with said cut-out die; and
   applying said sole to a piece of footwear.

2. The method of claim 1, wherein said water and polyurethane mixture comprises is 5.2 oz. of polyurethane and 0.6 oz. of water.

3. The method of claim 1, wherein said rubber mixture comprises 5.2 oz. of polyurethane, 0.6 oz. of water, and one pound of rubber granules.

4. The method of claim 3, wherein said rubber mixture further comprises 0.5 oz. said felt fuzz.

5. The method of claim 1, wherein said hydraulic press comprises two plates, the method further comprising the step of:
   lubricating said two plates of said hydraulic press.

6. The method of claim 5, wherein a lubricant is selected from this list comprising: canola oil, palm oil, and coconut oil.

7. The method of claim 1, wherein said screen comprises ⅛" holes.

8. The method of claim 7, wherein said screen comprises chicken wire within a frame.

9. A method of manufacturing a shoe sole, the method comprising the steps:
   acquiring a plurality of tennis balls
   grinding the tennis balls in a granulator, thereby generating felt fuzz and rubber granules;
   passing said felt fuzz and rubber granules through a screen having ⅛" holes, thereby separating said rubber granules from said felt fuzz;
   combining 0.6 oz of water and 5.2 oz of polyurethane, resulting in a water and polyurethane mixture;
   combining said water and polyurethane mixture with one pound of said rubber granules;
   mixing said rubber granules and said water and polyurethane mixture into a rubber mixture and adding 0.5 oz of said felt fuzz to said rubber mixture;
   lubricating two plates of a hydraulic press;
   placing said rubber mixture into said hydraulic press between said two plates;
   pressing said rubber mixture into a sheet;
   curing said sheet for three hours;
   selecting a cut-out die, said cut-out die shaped for forming a footwear sole;
   cutting a sole from said sheet with said cut-out die; and
   applying said sole to a piece of footwear.

* * * * *